United States Patent
Watanabe

(10) Patent No.: US 6,936,296 B2
(45) Date of Patent: Aug. 30, 2005

(54) ICE CREAM AND OTHER FOODS MADE FROM SOYBEAN FINE POWDER

(76) Inventor: Tadahiko Watanabe, c/o Goushi Kaish Watanabekanpoudo, of 4679-43, Oaza Nakakura, Karuizawa-cho, Kitasaku-Gun, Nagano (JP)

( * ) Notice: Subject to any disclaimer, the term of this patent is extended or adjusted under 35 U.S.C. 154(b) by 328 days.

(21) Appl. No.: 10/136,510

(22) Filed: May 1, 2002

(65) Prior Publication Data

US 2003/0185962 A1 Oct. 2, 2003

(30) Foreign Application Priority Data

Mar. 29, 2002 (JP) ........................................ 2002-096421

(51) Int. Cl.⁷ .............................. A23L 1/20; A23G 9/00
(52) U.S. Cl. ....................... 426/634; 426/665; 426/580; 426/101
(58) Field of Search ................................ 426/634, 101, 426/665, 580

(56) References Cited

U.S. PATENT DOCUMENTS 5,807,602 A * 9/1998 Beutler et al. .............. 426/598

FOREIGN PATENT DOCUMENTS

| DE | 3801045   | * | 8/1988  |
| JP | 62003743  | * | 1/1987  |
| JP | 62294040  | * | 12/1987 |
| JP | 63216435  | * | 9/1988  |
| JP | 09-065834 | * | 3/1997  |

OTHER PUBLICATIONS

Japan Patent No. 61–087114 filed Apr. 17, 1986, & published Oct. 27, 1987 entitled "Ice Cream–Like Food".(with English Abstract).

Japan Patent Publication No. 61–136481 filed Jun. 12, 1986, & published Dec. 21, 1987 entitled "Frozen Food using Soybean Flour".(with English Abstract).

* cited by examiner

Primary Examiner—Anthony Weier
(74) Attorney, Agent, or Firm—Curtis L. Harrington

(57) ABSTRACT

The present invention relates to an ice cream and other foods made from soybean fine powder, and producing method thereof, and it is in the purpose offering the ice cream and other foods made from soybean fine powder which lost the soybean smell, feel good to the tongue and containing soybean fiber. The ice cream and other foods made from soybean fine powder, wherein soybean fine powder is used to make and soybean fiber and a vegetable oil which melting point is less than 6 centigrade are contained.

2 Claims, No Drawings

ICE CREAM AND OTHER FOODS MADE FROM SOYBEAN FINE POWDER

BACKGROUND OF THE INVENTION

1. Technical Field of the Invention

The present invention relates to an ice cream and other foods made from soybean fine powder, and producing method thereof, and it is in the purpose offering the ice cream and other foods made from soybean fine powder which lost the soybean smell, feel good to the tongue and containing soybean fiber.

The definition that ice cream contains each ice cream which the milk solidity is more than 15 percent and the milk fat is more than 8 percent, ice milk which the milk solidity is more than 10 percent and the milk fat is more than 3 percent and lact ice which the milk solidity is more than 3 percent is applied in this invention.

Moreover, ice cream and other foods means food that a feeling to the tongue is similar to said ice cream and no milk product are used as raw material in this invention.

2. Prior Art

Soybean that is the seed of Glycine max Merrill is familiar to many years, and it is typical as raw materials of the side dishes of Japanese foods and seasonings. Soybean is a food ingredient with high nutritive value because it contains richly protein, fiber and fat etc. and also contains vitamin and mineral with sufficient balance. A soybean is made to products such as miso, soy sauce, tofu, natto, soy milk, and confectionery etc. as processed foods.

On the other hand, milk includes all required nutrients and is extremely excellent in the rate of digestion. Milk is widely familiar to from the child to the adults since nutritive value is high, there is much amount of supply and a price is also comparatively cheap.

However, although milk is squeezed out of dairy cattle, there is high possibility that agricultural chemicals is sprayed on grasses which dairy cattle uses as food, and the milk squeezed out of the dairy cattle which eat the grasses was not necessarily safe because antibiotics is mixed to the food in order to protect a diary cattle that can take nutrition safely and abundantly instead of milk, and this inventor paid his attention to the ice cream and other foods that used the soybean.

Although, in the past, many trials which is going to produce particularly soybean ice cream in the cold confectionery which used soybean has done, the ice cream and other foods which used soybean was not to be put a thing to practical use because it has faults like it has soybean smell and a feeling to the tongue is bad, etc. Especially, the ice cream and other cold confectionery made from soy milk is inferior about flavor and a feeling to the tongue, and the nutritive value is also interior because solid contents like a soybean fiber is removed in a process of making soy milk. Although there are some ice cream and other cold confectionery which contain an soybean fiber existed, it has prevented that ice cream become easy to melt using the butter which melting point is high and the oil with the high unsaturation degree, for example, palm oil etc., in raw materials.

BRIEF SUMMARY IF THE INVENTION

The present invention is made in order to solve all the above-mentioned problems, and it tends to make the soybean ice cream and other foods that the soybean smell lost, the feeling to the tongue is good and it excels about nutritive value as including a soybean fiber.

That is, the invention is related to the ice cream and other foods made from soybean fine powder, wherein soybean fine powder is used to make and soybean fiber and a vegetable oils and fats which melting point is less than 6 centigrade are contained.

The invention is related to the ice cream and other foods made from soybean fine powder, wherein said soybean fine powder is minute fine powder of the particles than 300 mesh.

The invention also relates to ice cream and other foods made from soybean fine powder, wherein said soybean fiber is contained from 0.07 to 2.0 percent of the weight in the said ice cream and other foods.

The invention further relates to ice cream and other foods made from soybean fine powder of claim 1, wherein neither of sugar, milk solidity and milk fat is included.

The invention also relates ice cream and other foods made from soybean fine powder, wherein neither of sugar, milk solidity and milk fat is included.

The invention also relates to ice cream and other foods made from soybean fine powder which is produced by a method comprising the steps of: making fine powder after soybeans are heated in 50–150 centigrade; mixing said soybean fine powder with water of about 10 times quantity and maturing in less than 10 centigrade; holding for 5–20 minutes after heating in 80–130 centigrade, and swelling; adding another raw materials; heating and sterilizing mix which mixed said raw materials; homogenizing said mix; refrigerating mix with water and refrigerant after sterilizing for 10–20 seconds in 80–85 centigrade; aging in less than 10 centigrade; flavoring; freezing.

The invention also relates to ice cream and other foods made from soybean fine powder which is produced by said method, wherein said water is monomolecular water.

DESCRIPTION OF PREFERRED EMBODIMENTS OF THE INVENTION

The ice cream and other foods made from soybean fine powder, and producing method thereof that is related to the present invention will be explained as follows.

First, it is desirable to use the soybean which is organically grown in the ice cream and other foods made from soybean fine powder that is related to the present invention.

Moreover, soybean fiber is contained at least more than 0.07 weight percent, preferably 0.07–2.0 weight percent, and more preferably 0.1–1.0 weight percent in the all food quantity. In the case that soybean fiber contained more than 2.0 weight percent, it is not desirable because the flavor and the feel to the tongue is bad and soybean smell becomes strong, on the other hand, in case that soybean fiber contained less than 0.07 weight percent, it is not also desirable because fiber can not be taken in sufficiently.

In addition, soybean fine powder using in the ice cream and other foods made from soybean fine powder that is related to the present invention can be bigger than a grain of 300 mesh, however, it is desirable to use the soybean fine powder which is smaller than a grain of 300 mesh from the pointed of a feel to the tongue.

Next, a producing method of ice cream and other foods made from soybean fine powder that relates to the present invention is explained.

First, material soybean is made into fine powder in the following method. After material soybean is done heat-treatment in the following temperature, it is smashed, and adjusted to the particles that are smaller than 300 mesh, preferably to the grain of 400–1000 mesh. As a condition of the heat-treatment, material soybean is heated in 50–150 centigrade, and more preferably it heated in 60–80 centigrade. Further, as a condition of the heating period, it is for 10–36 hours and for 12–24 hours are more desirable. When heating temperature is more than 150 centigrade, protein denaturation becomes easy to happen, and when material soybean is treated in less than 50 centigrade, an enzyme does not inactivate fully, hence neither conditions are preferable. The soybean powder of about 100 mesh pass can be used by the case.

1–20 weight percent, preferably 5–12 weight percent of said fine soybean powder is mixed with 80–99 weight percent, preferably 88–95 weight percent of water, and matured. As a condition of mature, it is matured less than 10 centigrade, preferably 5–10 centigrade. Soybean fine powder absorbs water fully and matures, it becomes easy to be processed.

As said before, a feeling to the tongue becomes bad, and soybean smell becomes strong, when soybean fine powder is contained more than 20 weight percent. When soybean fine powder is less than 1 weight percent, because of soybean fiber is less than 0.07 weight percent in all quantity of ice cream, and it can not take enough dietary fiber, hence it is not preferable.

The water that said soybean fine powder is mixed with is not particularly limited, and it is desirable to use water of little cluster (mentioned as monomolecular in following). In generally, most water that exists in the nature forms the group called a cluster. Cluster is a group formed by hydrogen bond to each other of water molecule. The water that exists in the nature forms cluster of about 13–23 water molecule. When this water flows away vertically through the magnetic field, hydrogen which has plus charge, and oxygen which has minus charge is pulled each other in the opposition direction, and a cluster is subdivided due to the collision and so on of the clusters.

Monomolecular that is used in the present invention is "cluster" of about 1–10 water molecule. Monomolecular is activated its molecular movement by a big cluster is resolved and becomes small.

In the present invention, when monomolecular water is used, mature time is 1.5–2 hours. Using monomolecular water can be shorten producing time, and it results the cost reduction.

When monomolecular water is not used in this process, it is desirable to be matured 5–24 hours.

Then, said matured soybean mixed liquor is heated from 80–130 centigrade, holed 5–20 minutes and swelled.

Next, each measured ingredient is mixed, and a mixture is made.

As the ingredient of ice cream and other foods in the present invention, oils and fats, a sweetener, stabilizer, flavor, colorant, emulsifier, and so on are shown, and these are added at optional rate.

Vegetable oils and fats that its melting point is less than 6 centigrade are used desirably. For example, the olive oil and the seed oil are used. A reason to limit in these oils and fats is that it can both remove the hardening such as coconut tree oil has and get feeling to the tongue in ice cream and other foods as same as flavor of coconut oil.

The following, the ingredient comparison of the seed oil, the olive oil and the coconut oil are shown in the table 1.

TABLE 1

The ingredient comparison of the seed oil, the olive oil and the coconut oil

|  | seed oil | olive oil | coconut oil |
|---|---|---|---|
| specific gravity (g/cm$^3$) | 0.9205 | 0.911 | 0.912 |
| saponification value | 189.5 | 188–196 | 246–264 |
| melting point (Centigrade) | −19.5 | 0–6 | 20–28 |

Sweetener gives sweetness, makes organization of ice cream and other foods, effects to freezing temperature of ingredient, and makes the organization smooth. Sweetener is not particularly limited.

Stabilizer is added for the purpose of stabilization of fine ice crystal that is made in ice cream by changing of temperature in processes of producing ice cream. Stabilizer dissolves in mix, gives moderate viscosity, keeps up bubble uniformity that causes in the case of freezing and hardening and retains crystal of ice fine. Further, the stabilizer makes appearance, organization and a feeling to the tongue better of ice cream. As stabilizer, it is not limited particularly, and carboxyl methylcellulose, alginic acid soda, locust bean gum and irish moss chondrus crispus are chosen.

Flavor is added to strengthen and improve of taste of ice cream food. As flavor, concoction flavor is used, and water-soluble flavor is used preferably.

Colorant is used to supplement and improve nature color of ice cream and other foods, and the pigment for food of the various colors is used.

Emulsifier is added to uniform organization of ice cream and other foods. As emulsifier, it is not limited particularly; lecithin, glycerin fatty acid ester and sorbitan fatty acid ester are chosen.

Next, mix is sterilized. The reason of sterilization is that from the point of hygiene and to prevent foreign odor in ingredient. As way of sterilization, it is done by the high temperature sterilization. It is held in 80–85 centigrade for about 5 minutes and sterilized.

After a mix is sterilized, it is homogenized. This is to mix various materials perfectly and to smooth by making the fiber of the soybean element fine. A mixture is cooled down by allowing to cool to 65–80 centigrade, given 150 kg/cm$^2$–220 kg/cm$^2$ pressure and homogenized by using homogenizer.

Next, mix is sterilized and cooled. As way of sterilization, after mix is heated with 80–90 centigrade, preferably 85 centigrade by using heat exchanger and held for about 20 seconds, each mixture is cooled down by using water of the normal temperature and refrigerant.

The mixture that it was cooled down by less than 10 centigrade is given to the aging tank and aged. The purpose of aging is so that increasing viscosity by going solid a fat ball and smoothing product organization by swelling soybean fiber. As a condition of the aging, mix is stored and aged in a tank less than 10 centigrade, preferably 5–7 centigrade for 5–24 hours.

After aging of mix, flavoring is done. Flavor is added to strengthen and improve of taste of characteristic of ice cream food. As kind of flavor, taste flavor which contains fruit flavor such as sesame, orange, strawberry and lemon, caffeine such as coffee, chocolate and tea, and so on are chosen.

Freezing is done at the end. Water is frozen in the process of freezing the moment air is added and whipping is set up.

The above manufacturing method can manufacture the ice cream and other foods which makes the soybean fine powder which relates this invention material.

The present invention is described to be more definite by mentioning the following preferred example of the present invention.

PREFERRED EMBODIMENT (Preferred Embodiment 1)

A material soybean was heated in 70 centigrade for 15 hours, and adjusted to the particle size 300 mesh after grinding. Next, the above soybean fine powder 10 kg was mixed with monomolecular water 90 kg, and matured with static aging for 1.5 hours in 7 centigrade. The soybean mixed liquid which made the said aging was heated in 95 centigrade for 10 minutes. The mixture of olive oil 4.5 kg that reducing malt sugar 30 kg, carboxymethyl cellulose 260 g were mixed there, and seed oil 4.5 kg was added. A mix was heated to 85 centigrade, and held for 5 minutes, and sterilized. After temperature was lowered by allowing to cool in 75 centigrade, pressure of 160 kg/cm$^2$ was given by using homozinizer and homogenized. Next, after mix was sterilized in 85 centigrade for 20 seconds by the heat exchanger, it was cooled down with water of the normal temperature and with refrigerant of 5 centigrade for 20 seconds each. It was made aging for 12 hours after cooling in 5 centigrade, then flavor 260 g was added, frozen, and ice cream was made.

(Preferred Embodiment 2)

As a preferred embodiment 2, in the producing method of the preferred embodiment 1, ice cream was made with materials soybean with 100 mesh powder.

(Preferred Embodiment 3)

As a preferred embodiment 3, in the producing method of the preferred embodiment 1, material soybean fine powder 25 kg was mixed with monomolecular water 75 kg, and ice cream was manufactured.

(Test)

The content of the soybean fiber of the ice cream made with the preferred embodiment 1, 2 and 3 was measured, and a comparative test was done about a feeling to the tongue and smell.

An enzyme-gravimetric method was used as the way of measuring soybean fiber.

As a method of the taste examination, with twenty people, the good from the bad of feeling to the tongue and whether smell of soybean is or not are evaluated with three steps.

The result is shown in Table 2.

TABLE 2

|  | Preferred embodiment 1 | Preferred embodiment 2 | Preferred embodiment 3 |
|---|---|---|---|
| Content of soybean fiber (percent) | 0.07 | 0.07 | 0.175 |
| feeling of taste (velvety) | ◯ | Δ | Δ |
| soybean smell | ◯ | ◯ | Δ |

(◯:good, Δ:average, X:bad)

From the result of the table 2, it found that the ice cream made with the preferred embodiment 1, 2 and 3, contains soybean fiber more than 0.07 weight percent. Moreover, it found that a feeling to the tongue is better when soybean fine powder whose particles are fine more than 300 mesh is used, and in ratio of soybean fine powder and water, soybean smell becomes strengthen when said soybean fine powder is compounded more than 20 weight percent.

From the above test result, the ice cream made by way of producing the ice cream food which makes soybean fine powder which relates present invention contains soybean fiber beyond the 0.07 weight percent in the all food quantity, a feeling to the tongue is fine, too, found that it is a good ice cream with no soybean smell.

The mixing example of the ice cream and other foods which relates to the present invention is shown in following.

| Prescription example 1) vanilla ice cream | |
|---|---|
| Soybean fine powder | 7.2 weight part |
| Monomolecular | 64.5 weight part |
| Reducing malt sugar | 21.5 weight part |
| Stabilizer | 0.2 weight part |
| Olive oil | 3.25 weight part |
| Seed oil | 3.25 weight part |
| Beta-carotene | A small amount |
| Flavor | 0.1 weight part |
| Prescription example 2) sesame ice cream | |
| Soybean fine powder | 9.0 weight part |
| Monomolecular | 60.8 weight part |
| Reducing malt sugar | 20.0 weight part |
| Stabilizer | 0.2 weight part |
| Olive oil | 3.0 weight part |
| Seed oil | 3.0 weight part |
| Black sesame paste | 3.0 weight part |
| Toasted sesame | 1.0 weight part |
| Prescription example 3) powdered green tea ice cream | |
| Soybean fine powder | 5.0 weight part |
| Monomolecular | 65.0 weight part |
| Reducing malt sugar | 23.8 weight part |
| Stabilizer | 0.2 weight part |
| Olive oil | 2.5 weight part |
| Seed oil | 2.5 weight part |
| Beta-carotene | A small amount |
| Vitamin C | A small amount |
| Powdered green tea | 1.0 weight part |

When the dietary fiber contained in the ice cream made by the above prescription example 1 and 2 was measured by the enzyme-gravimetric method, in the vanilla ice cream of the prescription example 1, the dietary fiber of the 0.8 weight percent in the ice cream 100 g, and in the sesame ice cream of the prescription example 2, ice cream, the dietary fiber of the 1.6 weight percent was contained in the ice cream 100 g.

As described above, the invention which relates to claim 1 of the present invention is related to the ice cream and other foods made from soybean fine powder, wherein soybean fine powder is used to make and soybean fiber and a vegetable oils and fats which melting point is less than 6 centigrade are contained, the ice cream food which contains soybean fiber can be provided. Not only dietary fiber improves a bowel movement and prevents intestinal retention of toxic substance, but also it effects with prevention of high cholesterol and the fat.

The invention that is related to the ice cream and other foods made from soybean fine powder, wherein said soybean fine powder is minute fine powder of the particles than 300 mesh, it can be provided the ice cream food that contains soybean fiber and a feeling to the tongue is smooth.

The invention related to the ice cream and other foods made from soybean fine powder, wherein said soybean fiber is contained from 0.07 to 2.0 percent of the weight in the said ice cream and other foods, it can be provided the ice cream food that contains soybean fiber enough, good for health and meets customer satisfaction.

The invention are related to the ice cream and other foods made from soybean fine powder, wherein neither of sugar, milk solidity and milk fat is included, it can decrease intakes of the sugar and fat that causes growing fat, hyperlipidemia and arteriosclerosis.

The invention is related to the ice cream and other foods made from soybean fine powder which is produced by a method comprising the steps of: making fine powder after soybeans are heated in 50–150 centigrade; mixing said soybean fine powder with water of about 10 times quantity and maturing in less than 10 centigrade; holding for 5–20 minutes after heating in 80–130 centigrade, and swelling; adding another raw materials; heating and sterilizing mix which mixed said raw materials; homogenizing said mix; refrigerating mix with water and refrigerant after sterilizing for 10–20 seconds in 80–85 centigrade; aging in less than 10 centigrade; flavoring; freezing, it can make ice cream food that a feeling to the tongue is well, no soybean smell and further contains soybean fibber.

The invention related to the ice cream and other foods made from soybean fine powder which is produced by said method, wherein said water is monomolecular water, it can reduce shortening of the manufacturing time, hence it can reduce the cost.

What is claimed is:

1. A method to make an ice cream-like food wherein soybean fine powder is used as a material comprising the steps of:

making fine powder after soybeans are heated in 50–150 centigrade, mixing 1–20 weight percent of said soybean fine powder with 80–99 weight percent of water and maturing in less than 10 centigrade, holding for 5–20 minutes after heating in 80–130 centigrade, and swelling, adding other raw materials, heating and sterilizing mix which is mixed with said raw materials, homogenizing said mix, refrigerating mix with water and refrigerant after sterilizing for 10–20 seconds in 80–85 centigrade, aging in less than 10 centigrade, flavoring, and freezing.

2. The method of claim 1 to make an ice cream-like food, wherein said water is a cluster of about 1–10 water molecules.

* * * * *